Aug. 16, 1938.   H. E. HODGSON   2,127,335
POWER TRANSMISSION MECHANISM FOR OPERATING BRAKES
Filed Oct. 2, 1936
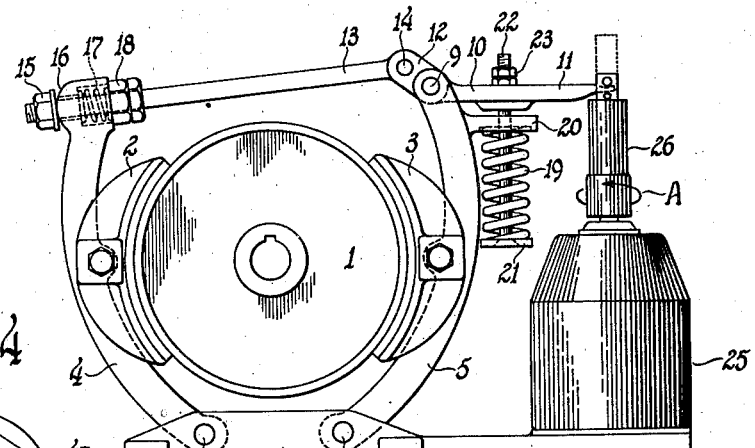
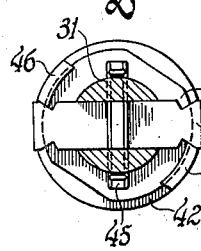
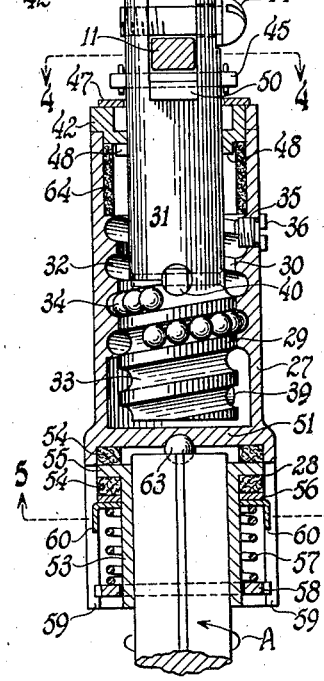
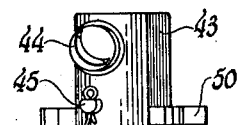
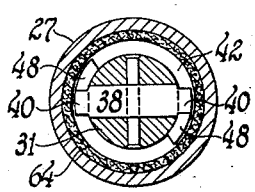
Inventor
Howard E. Hodgson
By Frank H. Hubbard
Attorney Patented Aug. 16, 1938

2,127,335

UNITED STATES PATENT OFFICE 2,127,335

POWER TRANSMISSION MECHANISM FOR OPERATING BRAKES

Howard E. Hodgson, Wauwatosa, Wis., assignor to Cutler-Hammer, Inc., Milwaukee, Wis., a corporation of Delaware Application October 2, 1936, Serial No. 103,707

5 Claims. (Cl. 188—171)

This invention relates to improvements in power transmission mechanisms, and while not limited thereto is particularly applicable to speed reducing driving mechanisms for motor operated brakes.

The invention has among its objects to provide an improved speed reducing driving mechanism for use in connection with motor driven apparatus such as motor operated brakes which is exceedingly compact and rugged in construction and reliable and efficient in operation.

Another object is to provide a speed reducing mechanism for apparatus of the aforesaid character which is completely enclosed and self-lubricating.

Another object is to provide a speed reducing mechanism for apparatus of the aforesaid character having means associated therewith for positively stopping the same in opposite limits and for frictionally dissipating the kinetic energy present in the driving motor in such limits.

Various other objects and advantages of the invention will hereinafter appear.

The accompanying drawing illustrates an embodiment of the invention which will now be described, it being understood that the embodiment illustrated is susceptible of modification without departing from the spirit and scope of the appended claims.

In the drawing,

Figure 1 is a side elevational view of a motor operated brake having a driving mechanism embodying the invention associated therewith.

Fig. 2 is a vertical sectional view of the driving mechanism illustrated in Fig. 1, the parts of such driving mechanism being shown in brake setting position.

Fig. 3 is a fragmentary vertical sectional view illustrating certain of the parts of the driving mechanism in brake releasing position.

Figs. 4 and 5 are sectional views on lines 4—4 and 5—5 of Fig. 2, and

Fig. 6 is a sectional view on line 6—6 of Fig. 3.

Referring to Fig. 1, the driving mechanism is shown in connection with a brake including a brake drum 1 to be secured to a motor or other device to be braked, oppositely arranged brake shoes 2 and 3 for frictionally engaging said drum on opposite sides thereof, and levers 4 and 5 supporting said shoes, respectively. The lower ends of levers 4 and 5 are pivotally mounted upon pins 6 and 7, respectively, carried by a stationary supporting base 8 and the upper end of lever 5 has a pivot pin 9 mounted thereon which carries an operating lever 10. Said operating lever is provided with arms 11 and 12, the latter being pivotally connected to one end of a link 13 by a pin 14. The opposite end of link 13 extends through an opening in the upper end of lever 4 and is provided with an adjustable nut 15 for engaging a curved surface 16 on said lever. Stop nut 15 is held in engagement with the surface 16 by a coil spring 17 which is held under compression between lever 4 and a nut 18 on link 13.

Arm 11 has a spring 19 associated therewith which is held under compression between a lug 20 on lever 5 and a washer 21 fixed to the lower end of a pin 22. Arm 11 and lug 20 are each provided with an opening for receiving pin 22 and the upper end of said pin is provided with an adjustable nut 23 for engaging said arm on the upper side thereof. Spring 19 acts through the medium of lever 10 and link 13 to bias levers 4 and 5 toward each other for engagement of brake shoes 2 and 3 with brake drum 1. Upon upward movement of arm 11 out of the position shown in Fig. 1 arm 12 and link 13 act as a toggle to move levers 4 and 5 in opposite directions for release of the brake shoes 2 and 3 from drum 1.

The brake is provided with a vertically arranged operating motor 25 which is fixed to a side extension on base 8. Said operating motor is operatively connected to the free end of arm 11 through the medium of a speed reducing jack 26 including a rotatable sleeve nut 27 having a slip clutch driving connection 28 between the same and motor 25, and a non-rotatable screw 29 which is operatively connected to the free end of arm 11.

The sleeve nut 27 has a bored portion 30 of reduced diameter intermediate its ends and the screw 29 is slidable therein and is provided with an upwardly extending cylindrical shank 31 which is of reduced diameter. The portion 30 of sleeve nut 27 has a half round spiral groove 32 therein and screw 29 is provided with a half round spiral groove 33 which mates with the former groove to provide a spiral channel which contains a plurality of balls 34. The balls 34 are inserted into the channel formed by grooves 32 and 33 through a tapped opening 35 in sleeve nut 27. The opening 35 is located adjacent the upper end of groove 32 and has a plug 36 screwed therein which acts as a stop to limit upward movement of the balls 34 within said groove. Sleeve nut 27 also has a pin 37 fixed thereto, said pin being located adjacent the lower end of groove 32 to limit downward movement of the balls 34 therein. The screw 29 is provided with stop pins 38 and 39 for limiting movement of the balls 34 in opposite directions within the groove 33. Stop pin 38 is fixed within an opening adjacent the lower end of screw 29 while stop pin 39 is fixed within an opening located at the upper end of said screw and is provided with end portions 40—40 which project into the space between the shank 31 and portion 30 of sleeve nut 27.

Motor 25 when energized rotates in a clockwise direction as indicated by arrow A (Fig. 1), and as is apparent from Fig. 2 when sleeve nut 27 is rotated in this direction the balls 34 roll within the grooves 32 and 33 to move screw 29 upwardly out of the position shown in Fig. 2. The pitch of the grooves 32 and 33 is such that the balls 34 are adapted to effect counterclockwise rotation of sleeve nut 27 when motor 25 is deenergized and downward pressure is applied to the screw 29.

The shank 31 of screw 29 is slidable within an opening in a guide member 42 mounted upon the upper end of sleeve nut 27 and the upper end of said shank is provided with a slot 43 for receiving the free end of arm 11 and carries a screw 44 for engaging said arm on the upper side thereof and a pin 45 for engaging said arm on the under side thereof. The guide member 42 is provided with a shouldered portion which fits within the sleeve nut 27 and the same is recessed to receive oppositely disposed upwardly extending projections 46—46 on the upper end of said sleeve nut. The projections 46—46 prevent rotation of guide member 42 with respect to sleeve nut 27 and said projections are recessed to receive a washer 47 which engages the upper face of said guide member to hold the same in position upon said sleeve nut. The lower face of guide member 42 is provided with oppositely disposed downwardly extending projections 48—48, and upon upward movement of screw 29 into a given limit said lugs are engaged by the end portions 40—40 of pin 39, as shown in Fig. 6, to stop clockwise rotation of sleeve nut 27 with respect to said screw. The projections 46—46 on the upper end of sleeve nut 27 cooperate with a stop 50 which is held within the slot 43 on the upper end of shank 31 by the pin 45. Upon downward movement of screw 29 into a given limit the opposite ends of stop 50 move into engagement with the projections 46—46 as shown in Fig. 4 to limit counterclockwise rotation of the sleeve nut 27 with respect to screw 29.

The lower end of sleeve nut 27 is closed by wall 51 having a cup projection 52 on the under side thereof. The slip clutch 28 is mounted within the cup projection 52 and includes a driving element 53 slidably mounted upon the shaft of motor 25 and a pair of cooperating friction rings 54—54. The driving element 53 is provided with a hub having a square opening therein for receiving a squared portion on the shaft of motor 25 and the same is also provided with a projecting flange 55 which is located between the friction rings 54—54. Friction rings 54—54 and flange 55 are clamped together between the lower face of wall 51 and a thrust ring 56 by a spring 57 which is held under compression between said thrust ring and a washer 58 secured within a groove provided on the lower end of the cup projection 52. Cup projection 52 is provided with oppositely disposed slots 59—59 and thrust ring 56 has oppositely disposed lugs 60—60 secured thereto which project into said slots to prevent rotation of said thrust ring within said cup projection. Sleeve nut 27 is supported upon the upper end of the shaft of motor 25 by a ball 63 which engages within recesses provided in the upper end of said shaft and in the lower face of wall 51.

As is apparent from the foregoing, upon energization of motor 25 sleeve nut 27 is driven through the medium of driving element 55 and friction rings 54 in a direction to move screw 29 and arm 11 upwardly against the action of spring 19 for release of the brake. As hereinbefore set forth, when screw 29 is moved upwardly into a given limit, clockwise rotation of sleeve 27 is stopped by engagement of pin 38 with the projections 48—48 on guide member 42. Upon stopping of clockwise rotation of sleeve nut 27 the motor is stalled but is maintained energized to hold the brake in released position. However, the arrangement is such that prior to stalling of the motor driving element 55 slips with respect to friction rings 54 to thereby frictionally dissipate the kinetic energy present in the moving parts of the motor. Upon deenergization of motor 25 the screw 29 moves downwardly under the action of spring 19 to permit setting of the brake. As hereinbefore set forth the sleeve nut 27 is then driven in a counterclockwise direction, and upon downward movement of the screw into a given limit counterclockwise rotation of said sleeve nut is stopped by engagement of stop 50 with the projections 46—46 on the upper end of said sleeve nut. During counterclockwise rotation of sleeve nut 27 motor 25 is driven through the medium of slip clutch 28 and upon stopping of counterclockwise rotation of said sleeve nut the kinetic energy present in the moving parts of the motor is frictionally dissipated by the slippage of the driving element 55 with respect to friction rings 54.

Sleeve nut 27 is partially filled with oil, and in order to prevent the escape of oil through the upper end of said sleeve nut a packing ring 64 is clamped between the lower face of cup member 42 and the shoulder formed by the portion 30 within the sleeve nut 27. As is apparent, upon operation of the brake screw 29 acts as a piston within the sleeve nut 27 to force oil through the channel formed by grooves 32 and 33 and around the balls 34 contained therein.

What I claim as new and desire to secure by Letters Patent is:

1. The combination with a motor and a device to be operated thereby, of power transmitting mechanism therebetween including a pair of members having mating spiral grooves therein, one of said members being associated with said motor to be driven thereby and the other being non-rotatable and being operatively connected to said device, a plurality of balls located within said grooves for effecting axial movement of said latter member upon rotation of said former member and a slip clutch driving connection between said motor and said former member.

2. The combination with a torque motor and a device to be operated thereby, of a power transmitting mechanism therebetween including parts having mating spiral grooves therein, one of said parts being associated with said motor to be driven thereby and the other being non-rotatable and being operatively connected to said device, a plurality of balls located within said grooves for effecting axial movement of said latter member upon rotation of said former member, means for stopping rotation of said former member in opposite limits, and a slip clutch driving connection between said motor and said former member adapted to slip upon stopping of said former member.

3. The combination with a spring set brake, of an operating motor therefor, a speed reducing driving connection between said motor and said brake comprising a screw jack having cooperating rotatable and non-rotatable screw elements, the latter being movable axially with respect to said former element upon rotation of said former element and being operatively connected to said brake and a slip clutch driving connection between said motor and said former screw element.

4. The combination with a brake having spring means associated therewith for effecting setting thereof, of an operating motor therefor, a speed reducing driving connection between said motor and said brake including a sleeve rotatable by said motor, a non-rotatable member located within said sleeve and operatively connected to said brake, said sleeve and said member having mating spiral grooves therein, and a plurality of balls located within said grooves for effecting axial movement of said member in a direction to release said brake upon rotation of said sleeve by said motor.

5. The combination with a brake having spring means for effecting setting thereof, of an operating motor therefor, a screw jack operating connection between said brake and said motor, said jack being movable into a given limit upon energization of said motor to effect release of said brake and being returnable to an opposite limit upon deenergization of said motor to permit resetting of said brake and a slip clutch driving connection between said motor and said screw jack for frictionally dissipating the kinetic energy present in said motor upon movement of said screw jack into either of said limits.

HOWARD E. HODGSON.